3,635,955
SUBSTANTIALLY PURE BASIC DYES DERIVED FROM 4-METHYLENE-1,3-DISUBSTITUTED-3,4-DIHYDROPYRIMIDONES

Guenter Hansen and Matthias Seefelder, Ludwigshafen, Germany, assignors to Badische Anilin- & Soda-Fabrik Aktiengesellschaft, Ludwigshafen (Rhine), Germany
No Drawing. Continuation-in-part of application Ser. No. 655,315, July 24, 1967. This application May 22, 1970, Ser. No. 39,861
Claims priority, application Germany, July 26, 1966, P 15 44 410.7
Int. Cl. C07d 51/34
U.S. Cl. 260—240 G     1 Claim

ABSTRACT OF THE DISCLOSURE

Substantially pure basic dyes derived from 4-methylene-1,3-disubstituted-3,4-dihydropyrimidones which are eminently suitable for dyeing and printing textile materials made of acrylonitrile polymers.

---

This application is a continuation-in-part of application Ser. No. 655,315 now abandoned.

The invention relates to substantially pure basic dyes having the formula:

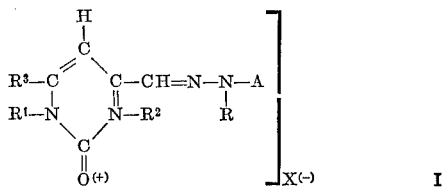

in which $R^1$ and $R^2$ each denotes a member selected from the class consisting of alkyl of 1 to 4 carbon atoms, cyclohexyl, benzyl and phenyl, $R^3$ denotes a member selected from the class consisting of hydrogen and phenyl, R denotes a member selected from the class consisting of methyl and ethyl, X denotes an anion selected from the class consisting of chloride, bromide, sulfate, nitrate, tetrachlorozincate, methosulfate, ethosulfate, formate, acetate and oxalate and A denotes a radical selected from the class consisting of phenyl, naphthyl and phenyl substituted by one to three members selected from the class consisting of methyl, methoxy, ethoxy, chlorine, bromine, acetylamino, hydroxy, nitro, phenylazo, methoxyphenylazo and phenylamino. These dyes are produced by coupling the diazo component of an amine having the Formula II $$A—NH_2 \qquad II$$

with a dihydropyrimidone having the formula

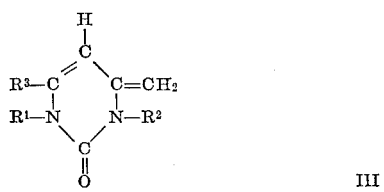

or a salt thereof having the formula

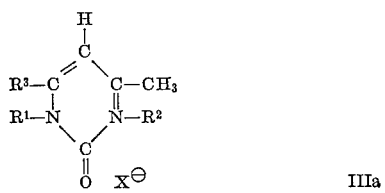

and alkylating the coupling product.

Specific examples for the alkyl groups $R^1$ and $R^2$ are methyl, ethyl and n-butyl.

Examples of dihydropyrimidones or coupling components having the Formula III are:

4-methylene-1,3-dimethyl-3,4-dihydropyrimidone-(2),
4-methylene-1,3-diethyl-3,4-dihydropyrimidone-(2),
4-methylene-1-methyl-3-ethyl-3,4-dihydropyrimidone-(2),
4-methylene-1,3-dimethyl-6-phenyl-3,4-dihydropyrimidone-(2)
4-methylene-1,3-diethyl-6-phenyl-3,4-dihydropyrimidone-(2) or
4-methylene-1,3-dicyclohexyl-3,4-dihydropyrimidone-(2).

Of these, 4-methylene-1,3-dimethyl-3,4-dihydropyrimidone-(2) and 4-methylene-1,3-dimethyl-6-phenyl-3,4-dihydropyrimidone-(2) are preferred.

The said compounds may be prepared by reaction of N,N'-disubstituted ureas with dicarbonyl compounds or derivatives thereof.

The diazo compounds A—NH₂ are derived from benzene or naphthalene and may bear substituents for example chlorine or bromine atoms, phenylazo groups, methyl groups, methoxy or ethoxy groups, acetylamino groups, phenylamino groups, hydroxy groups or nitro groups.

The following components are given as examples:

aminobenzene,
1-amino-4-methoxybenzene,
1-amino-3-methoxybenzene,
1-amino-2-methoxybenzene,
1-amino-2-chlorobenzene,
1-amino-3-chlorobenzene,
1-amino-4-chlorobenzene,
1-amino-2-methylbenzene,
1-amino-3-methylbenzene,
1-amino-4-methylbenzene,
1-amino-4-acetylaminobenzene,
1-amino-2-methyl-5-chlorobenzene,
1-amino-2-methyl-4-chlorobenzene,
1-amino-2,4-dichlorobenzene,
1-aminonaphthalene,
2-aminonaphthalene,
1-amino-2,5-dimethoxybenzene,
1-amino-2,4-dimethoxybenzene,
1-amino-2,4-dimethoxy-5-chlorobenzene,
1-amino-2,4,5-trichlorobenzene,
1-amino-3-nitrobenzene,
1-amino-4-nitrobenzene,
1-amino-2-methyl-4-nitrobenzene,
1-amino-4-methyl-2-nitrobenzene,
1-amino-4-chloro-2-nitrobenzene,
1-amino-4-methoxy-2-nitrobenzene,
1-amino-4-phenylazobenzene and
1-amino-4-phenylaminobenzene.

Of these, aminobenzene, 1-amino-4-methoxybenzene, 1-amino-3-methoxybenzene and 1-amino-2-methoxybenzene are preferred.

Coupling the diazotized amines A—NH₂ with the dihydropyrimidones is advantageously effected in aqueous medium at a pH value of from 4 to 7. In the acid pH range the coupling products obtained are in the form of salts corresponding to Formula I above in which R denotes hydrogen, but above pH 6 they are in the form of dye bases corresponding to Formula IV

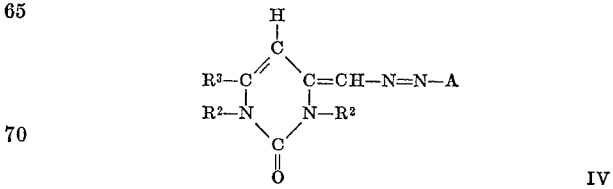

which are then alkylated to produce compounds in which R denotes methyl or ethyl.

Alkylation of the dye bases with alkylating agents is advantageously carried out in organic solvents, particularly hydrocarbons or halohydrocarbons, and preferably at temperatures of 40° to 100° C. with or without the addition of acid-binding agents, for example magnesium oxide or zinc oxide. The alkylating agents are preferably methylating agents, for example methyl toluenesulfonate or methyl iodide, particularly dimethyl sulfate. Other alkylating agents, such as diethyl sulfate may also be used.

The anion introduced by protonation with proton acids or by alkylation of the dye bases with an alkylating agent, may be replaced by another anion by conventional methods, for example by double decomposition.

Examples of specific anions are chloride, sulfate, bromide, nitrate, tetrachlorozincate, methosulfate, ethosulfate, oxalate, formate or acetate.

Examples of specific solvents which are suitable for the alkylation reaction are chloroform, toluene, xylene, chlorobenzene and dichlorobenzene. When the reaction (which may be followed chromatographically) is over, the reaction mixture is acidified with mineral acids, such as hydrochloric acid, and the alkylated dye formed is precipitated by adding precipitants, for example sodium chloride, zinc chloride or naphthalenesulfonic acid. The dyes according to the invention are obtained in excellent yields and very high purity. The new compounds are basic dyes and may be used as such. They are particularly suitable for dyeing and printing acrylonitrile polymers and copolymers and on these materials give brilliant dyeings having yellow to violet shades having very good fastness to wet treatments and decatizing.

Dyes in which $R^1$ and $R^2$ are alkyl radicals have particularly valuable properties. Methyl and ethyl groups are preferred as alkyl radicals.

As compared with the dyes known from German printed application No. 1,083,000, the dyes according to Formula I are distinguished by the excellent purity in which they are obtained in coupling.

The invention is illustrated by the following examples in which parts and percentages are by weight, unless stated otherwise. Parts by volume bear the same relation to parts by weight as the liter (STP) to the kilogram.

EXAMPLE 1

10.7 parts of 1-amino-4-methylbenzene is dissolved cold in 500 parts of water and 25 parts of 36% hydrochloric acid, the solution is filtered and 150 parts of ice is added followed gradually by 30 parts of 23% sodium nitrite solution. The whole is stirred for another two hours while cooling, the excess of nitrite is destroyed by adding sulfaminic acid and the diazo solution is allowed to flow into a solution of 25.0 parts of 1,3,4-trimethyl-3,4-dihydropyrimidonium-(2)-hydrogen sulfate in 200 parts of ice and 200 parts of water. The pH value of the mixture is adjusted to 4 in the course of two hours by the gradual addition of sodium acetate solution, and then 500 parts of sodium chloride solution is added to precipitate the dye which is suction filtered, washed with water and dried. 25 parts of a red-brown compound is obtained which dissolves with red color in hot water and dyes acrylonitrile polymer fibers bright orange shades from an acetic acid or sulfuric acid liquor.

14.6 parts of the dye thus obtained is suspended together with 3 parts of magnesium oxide in 200 parts of chloroform. 10 parts of dimethyl sulfate is added and the mixture is stirred at 60° C. until, after about three hours, methylation is over as detected by thin layer chromatography. 200 parts of a 5% hydrochloric acid is then allowed to run in and the chloroform is distilled off. 100 parts of saturated common salt solution is added to the hot mixture to complete precipitation of the dye. After cooling, the deposited dye is suction filtered, washed with a little 5% commmon salt solution and dried. 21 parts of an orange powder is obtained which dissolves in hot water and dyes acrylonitrile polymer cloth bright, very light-fast reddish yellow shades from an acid liquor.

EXAMPLE 2

12.3 parts of 1-amino-2-methoxybenzene is dissolved cold in 250 parts of water and 25 parts of 36% hydrochloric acid, the solution is filtered and 150 parts of ice is added followed by 30 parts of a 23% sodium nitrite solution. The whole is stirred for another two hours with external cooling, the excess of nitrite is removed by adding sulfaminic acid and the diazo solution is combined with a solution of 25 parts of 1,3,4-trimethyl-3,4-dihydropyrimidonium-(2)-hydrogen sulfate in 200 parts of water and 200 parts of ice. The mixture is adjusted to pH 6 to 7 with sodium carbonate solution in the course of two hours, after which the deposited dye base is suction filtered, washed with water and dried. A brown-yellow powder is obtained which dissolves with a red color in dilute acids and dyes acrylonitrile polymer fibers bright scarlet shades.

10 parts of dimethyl sulfate is added to a solution of 13.6 parts of the dye base thus obtained in 200 parts of chloroform. The mixture is stirred at the boiling temperature of chloroform. One to two hours later, methylation is over. Working up is carried out as described in Example 1 and a dye is obtained which dyes acrylonitrile polymers very fast neutral yellow shades.

EXAMPLE 3

12.3 parts of 1-amino-4-methoxybenzene is diazotized as described in Example 2. The diazonium solution is mixed with a solution of 23.5 parts of 4-methylene-1,3-dimethyl-6-phenyl - 3,4 - dihydropyrimidone-(2) having a melting point of 100° to 102° C., 300 parts of water, 25 parts of 36% hydrochloric acid and 100 parts of ice. The mixture is adjusted to pH 4 to 5 in the course of two hours by adding sodium acetate solution and the deposited dye is suction filtered and dried. A dark colored powder is obtained which dyes acrylonitrile polymer cloth neutral red shades from an acid liquor. If 10.7 parts of p-toluidine is used instead of 12.3 parts of 1-amino-4-methoxybenzene, the procedure otherwise being the same, a dye is obtained which dyes acrylonitrile polymer fibers bright scarlet shades.

19.2 parts of the dye obtained as described above is quaternized in a mixture of 200 parts of chloroform, 3 parts of magnesium oxide and 10 parts of dimethylsulfate at 60° C., and the whole is worked up as described in Example 1. A brown powder is obtained which dyes acrylonitrile polymer cloth fast bright orange shades.

EXAMPLE 4

12.3 parts of 1-amino-4-methoxybenzene is diazotized as described in Example 2 and combined with a mixture of 27.8 parts of 4-methyl-1,3-diethyl-3,4-dihydropyrimidonium-(2)-hydrogen sulfate, 200 parts of water and 200 parts of ice. The mixture is adjusted to pH 4 to 5 in the course of two hours by adding sodium acetate solution, then 400 parts of a saturated common salt solution is added and the deposited dye is suction filtered and dried. A red-brown powder is obtained which dyes acrylonitrile polymer fibers fast scarlet shades from an acetic acid or sulfuric acid liquor.

15.0 parts of the dye thus obtained is methylated as described in Example 1. The reaction product is a brown powder which dissolves with a red color in hot water and dyes acrylonitrile polymer cloth very fast bright orange shades from an acid liquor.

EXAMPLE 5

A mixture of 19.7 parts of 4-aminoazobenzene, 120 parts of water and 0.2 part of the reaction product of oleylamine with about 12 moles of ethylene oxide is stirred at room temperature overnight, 40 parts of a 36% hydrochloric acid is then added and, after fifteen minutes, 600 parts of ice and 30 parts of a 23% sodium nitrite solution; the whole is stirred for two hours at 0° to 5° C. and filtered. The filtrate is combined with a mixture of 27.5 parts of 1,4-dimethyl-3-ethyl-3,4-dihydropyrimidonium-(2)-hydrogen sulfate, 200 parts of water and 200 parts of ice. The coupling mixture is adjusted to pH 7 in the course of two hours with a 10% sodium carbonate solution and the deposited dye is suction filtered and dried. A red-yellow powder is obtained which dissolves in dilute acids and dyes acrylonitrile polymer fibers bright red shades.

18.0 parts of the dye base thus obtained is methylated as described in Example 2 and worked up. A brown powder is obtained which dissolves in water and dyes acrylonitrile polymer fibers very fast orange shades from an acid liquor.

EXAMPLE 6

18.4 parts of 1-amino-4-phenylaminobenzene is stirred cold into 200 parts of water and 25 parts of 25% hydrochloric acid and then 250 parts of ice and 30 parts of 23% sodium nitrite solution are added. After stirring for two hours the diazo solution is combined with a solution of 25.0 parts of 1,3,4-trimethyl-3,4-dihydropyrimidonium-(2)-hydrogen sulfate in 200 parts of water and the resultant mixture is adjusted to pH 4 to 5 with sodium acetate solution in the course of two hours. The deposited dye is suction filtered, washed with a little water and dried. A blue-red powder is obtained which dissolves in hot water and dyes acrylonitrile polymer fibers bright violet shades from an acetic or sulfuric acid liquor. After methylation according to the procedures specified the alkylated dye gives scarlet dyeings having good fastness properties.

By using the starting components set out in the following tables and subsequent methylation compounds having the Formula I in which R denotes a methyl group are obtained which dye acrylonitrile polymer fibers in the shades indicated:

TABLE 1

Azo component: 4-methylene-1,3-dimethyl-3,4-dihydropyrimidone-(2)

| Diazo component | Shade |
|---|---|
| 6-methyl-3,4'-dimethoxy-4-aminoazobenzene | Scarlet. |
| 2-aminonaphthalene | Orange. |
| 2,4-dichloroaniline | Yellow. |
| Aminobenzene | Do. |
| 2-amino-4-chloro-1-hydroxybenzene | Yellow orange. |
| 1-amino-2-nitrobenzene | Yellow. |
| 1-amino-2-methoxy-4-nitrobenzene | Do. |
| 1-amino-2-nitro-4-chlorobenzene | Do. |
| 1-amino-4-bromobenzene | Do. |
| 1-amino-3-methylbenzene | Do. |
| 1-amino-2-methylbenzene | Do. |
| 1-amino-2,4-dimethoxy-5-chlorobenzene | Orange. |
| 1-amino-3-methoxy-4-methylbenzene | Do. |
| 1-aminonaphthalene | Do. |
| 1-amino-4-nitrobenzene | Yellow. |
| 1-amino-4-acetylaminobenzene | Red-orange. |
| 1-amino-3-chlorobenzene | Yellow. |
| 1-amino-4-chlorobenzene | Do. |

TABLE 2

Azo component: 4-methylene-1,3-dimethyl-6-phenyl-3,4-dihydropyrimidone-(2)

| Diazo component | Shade |
|---|---|
| 1-amino-4-chlorobenzene | Reddish yellow. |
| 1-amino-4-acetylaminobenzene | Orange. |
| 2-aminonaphthalene | Do. |
| Aminobenzene | Yellow. |
| 1-amino-3-methylbenzene | Reddish yellow. |
| 1-amino-4-nitrobenzene | Orange yellow. |
| 1-amino-4-phenylaminobenzene | Red-violet. |

The invention is hereby claimed as follows:

1. A substantially pure basic dye of the formula

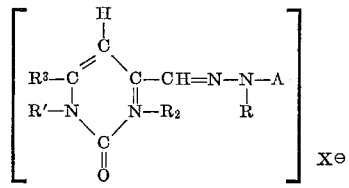

in which $R^1$ and $R^2$ each denotes a member selected from the class consisting of alkyl of 1 to 4 carbon atoms, cyclohexyl, benzyl and phenyl, $R^3$ denotes phenyl, R denotes a member selected from the class consisting of methyl and ethyl, X denotes an anion selected from the class consisting of chloride, bromide, sulfate, nitrate, tetrachlorozincate, methosulfate, ethosulfate, formate, acetate and oxalate and A denotes a radical selected from the class consisting of phenyl, naphthyl and phenyl substituted by one to three members selected from the class consisting of methyl, methoxy, ethoxy, chlorine, bromine, acetylamino, hydroxy, nitro and phenylamino.

References Cited

FOREIGN PATENTS

| 206,549 | 12/1959 | Austria | 260—240 G |
| 570,686 | 2/1959 | Belgium | 260—240 G |
| 1,083,000 | 9/1962 | Germany | 260—240 G |

JOHN D. RANDOLPH, Primary Examiner

U.S. Cl. X.R.

8—177; 260—146, 152, 186

PO-1050
(5/69)

UNITED STATES PATENT OFFICE
CERTIFICATE OF CORRECTION

Patent No. 3,635,955　　　　　　　　　Dated January 18, 1972

Inventor(s) Guenter Hansen and Matthias Seefelder

It is certified that error appears in the above-identified patent and that said Letters Patent are hereby corrected as shown below:

Column 3, line 75, "commmon" should read -- common --.

Column 6, claim 1, in the formula, "R' " should read -- $R^1$ --.

Signed and sealed this 6th day of June 1972.

(SEAL)
Attest:

EDWARD M. FLETCHER, JR.　　　　　ROBERT GOTTSCHALK
Attesting Officer　　　　　　　　　Commissioner of Patents